(12) United States Patent
Baik et al.

(10) Patent No.: US 12,548,863 B2
(45) Date of Patent: Feb. 10, 2026

(54) BATTERY

(71) Applicant: Rivian IP Holdings, LLC, Plymouth, MI (US)

(72) Inventors: Yunki Baik, San Jose, CA (US); Ki Woon Kim, Milpitas, CA (US); Prajanya Sunil Kendrekar, San Jose, CA (US); Arvinth Chandar Rathinam, Sunnyvale, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 709 days.

(21) Appl. No.: 17/878,235

(22) Filed: Aug. 1, 2022

(65) Prior Publication Data

US 2024/0039130 A1    Feb. 1, 2024

(51) Int. Cl.
*H01M 50/538* (2021.01)
*H01M 50/534* (2021.01)
*H01M 50/536* (2021.01)

(52) U.S. Cl.
CPC ....... *H01M 50/538* (2021.01); *H01M 50/536* (2021.01); *H01M 2220/20* (2013.01)

(58) Field of Classification Search
CPC ... H01M 50/538; H01M 50/536; H01M 50/58
See application file for complete search history.

(56) References Cited

U.S. PATENT DOCUMENTS

| | | | | |
|---|---|---|---|---|
| 3,519,485 | A * | 7/1970 | Cailley | H01M 4/70 429/141 |
| 2009/0208816 | A1 * | 8/2009 | Viavattine | H01M 4/70 429/161 |
| 2019/0280256 | A1 | 9/2019 | Baik et al. | |
| 2021/0218006 | A1 * | 7/2021 | Gao | H01M 50/536 |

* cited by examiner

*Primary Examiner* — Kenneth J Douyette
(74) *Attorney, Agent, or Firm* — Foley & Lardner LLP

(57) ABSTRACT

A battery cell can include a tab having a first portion and a second portion. The battery cell can include an electrode having an uncoated region. The battery cell can include a current collector. The tab can be disposed within a slit of the current collector. The first portion and the second portion of the tab can electrically couple the current collector with the electrode via the uncoated region of the electrode.

20 Claims, 13 Drawing Sheets

BATTERY

Electric vehicles can include various electrical components that provide power to the vehicle. The electrical components can be electrically coupled with vehicle components to power the vehicle.

SUMMARY

A battery cell can include an electrode having an active material coated region and an uncoated region. A sub tab can facilitate electrically coupling the electrode with a current collector. The sub tab can facilitate providing a welding space between the uncoated region of the electrode and the current collector. The current collector can electrically couple the electrode with various other components of the battery cell. The geometry and orientation of the sub tab can provide a substantially small welding space, which can effectively increase an amount of energy per volume of the battery cell.

At least one aspect is directed to a battery cell. The battery cell can include a tab including a first portion and a second portion. The battery cell can include an electrode having an uncoated region. The battery cell can include a current collector. The tab can be disposed within a slit of the current collector. The first portion and the second portion of the tab can electrically couple the current collector with the electrode via the uncoated region of the electrode.

At least one aspect is directed to a system. The system can include a battery cell having an electrode and a current collector. The system can include a tab disposed within a slit of the current collector and including a first portion and a second portion. The first portion and the second portion of the tab can electrically couple the current collector with the electrode.

At least one aspect is directed to a method. The method can include welding a portion of a tab with an uncoated region of an electrode. The method can include receiving, by a slit of a current collector, the tab. The method can include welding the current collector with another portion of the tab to electrically couple the current collector with the uncoated region of the electrode of a battery cell.

At least one aspect is directed to a method. The method can include providing a battery cell. The battery cell can include a tab including a first portion and a second portion. The battery cell can include an electrode having an uncoated region. The battery cell can include a current collector. The tab can be disposed within a slit of the current collector. The first portion and the second portion of the tab can electrically couple the current collector with the electrode via the uncoated region of the electrode.

At least one aspect is directed to an electric vehicle. The electric vehicle can include a battery cell having an electrode and a current collector. The electric vehicle can include a tab having a first portion and a second portion. The tab can be disposed within a slit of the current collector and the first portion and the second portion of the tab can electrically couple the current collector with the electrode.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of battery cells and methods, apparatuses, and systems of the manufacture thereof. The various concepts introduced above and discussed in greater detail below may be implemented in any of numerous ways.

This disclosure is generally directed towards a tab of a battery cell. The tab can be a T-shaped sub tab that facilitates increasing energy density of the battery cell by providing a small welding area between a current collector and one or more foils that make up the stacked electrode (e.g., a jelly roll or stack) of the battery cell. A slit of the current collector can receive the T-shaped sub tab such that the T-shaped sub tab can be laser welded to the current collector and to one or more foils of the battery cell. The T-shaped sub tab has a relatively small volume of space to electrically couple the foils with the current collector to increase the energy density of the cell by allowing for a larger volume of active electrode material within the jelly roll.

The systems and methods described herein have a technical advantage of increased energy density of a battery cell. The systems and methods described herein provide a sub tab having a general "T" shape to facilitate providing a welding space between uncoated regions of one or more foils and a current collector. The small welding space of the sub tab allows for more active material coating of electrodes within an electrode stack of a battery cell, which generates more energy per volume.

Figure 1:
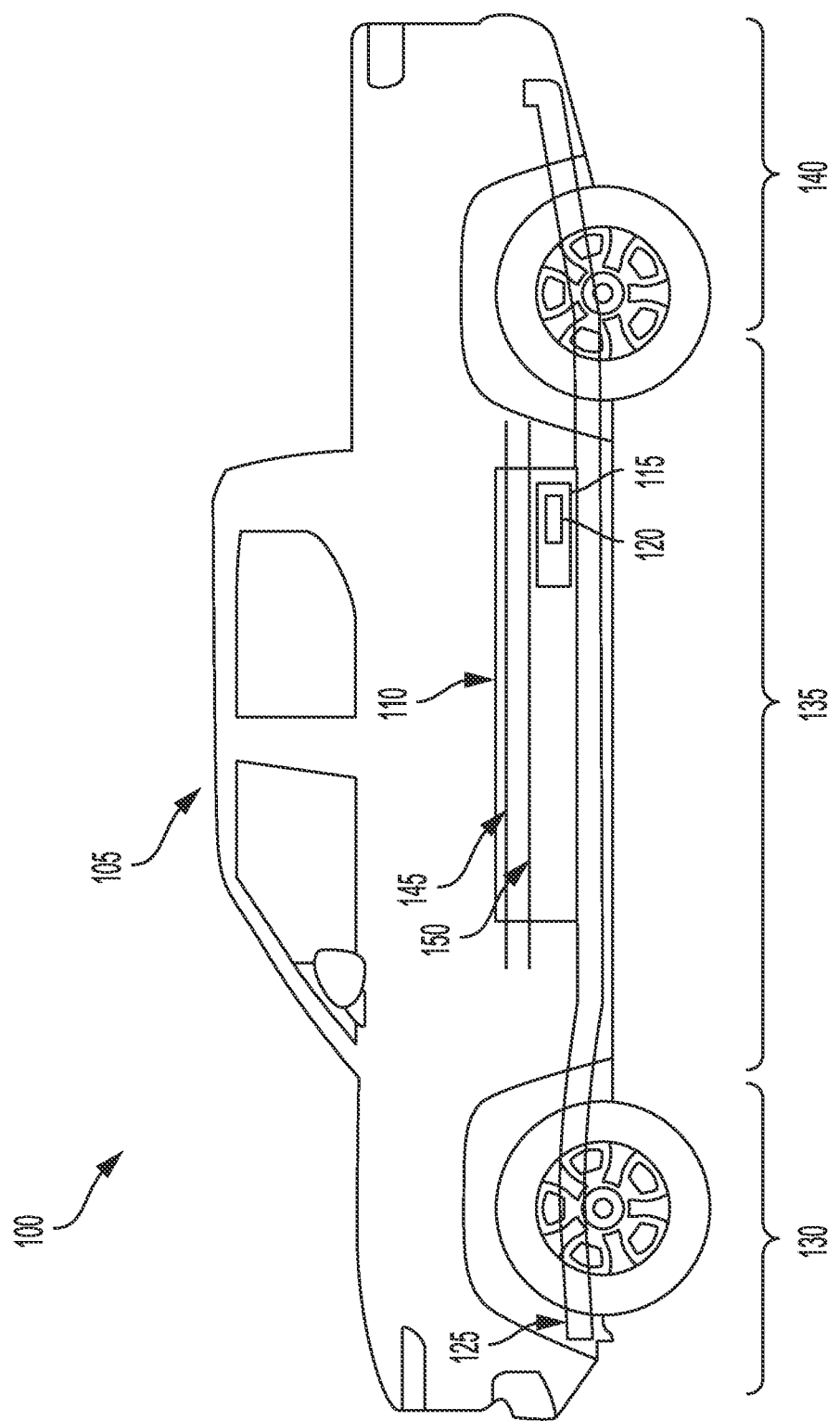
FIG. 1 depicts an example side view of an electric vehicle, in accordance with implementations.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
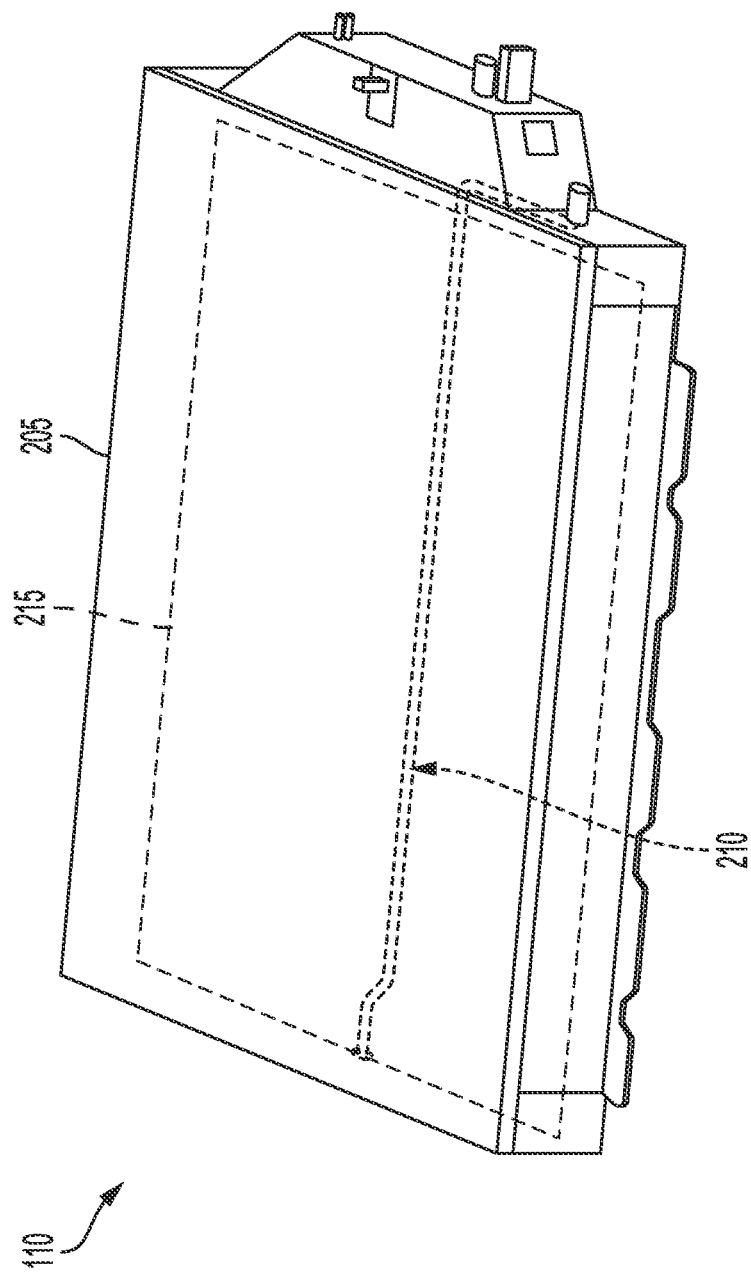
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include a group of cylindrical cells, prismatic cells, pouch cells, or another form factor of battery cells 120. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
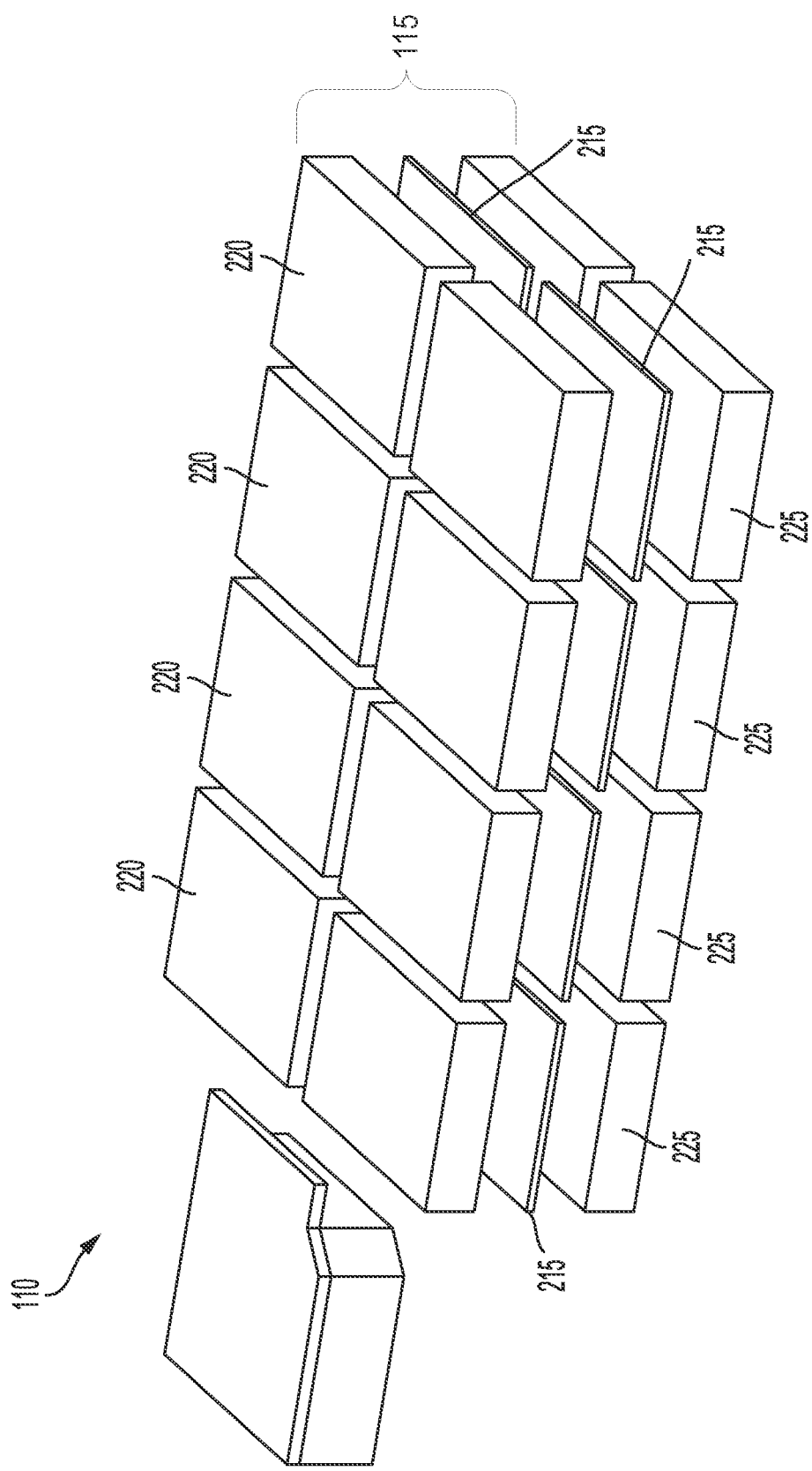
FIG. 2B depicts an example perspective view of a battery module, in accordance with implementations.
Figure 2C:
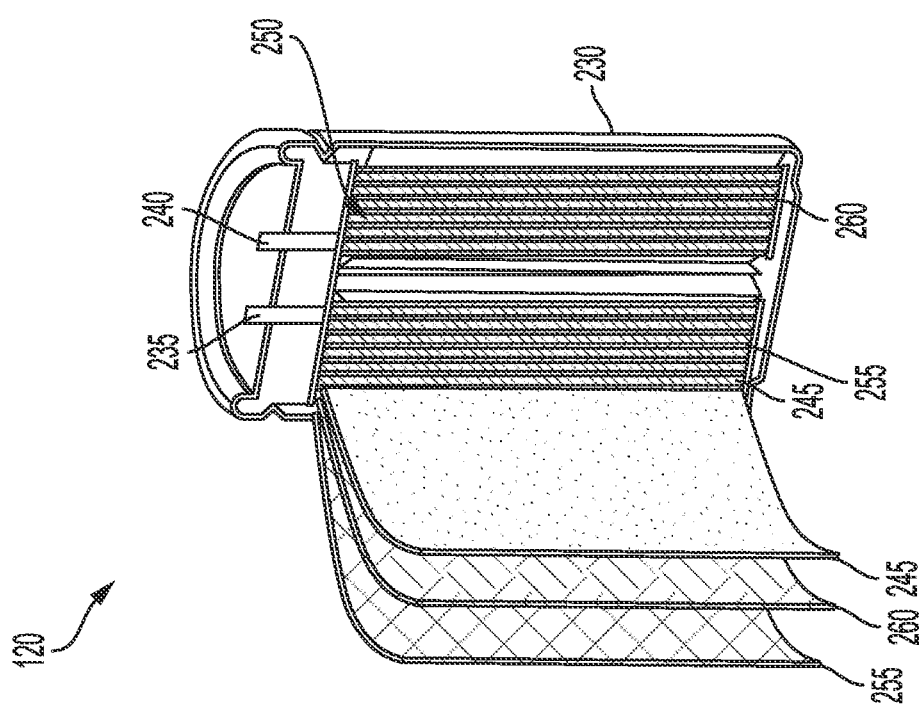
FIG. 2C depicts an example perspective view of a battery cell, in accordance with implementations.
Figure 2D:
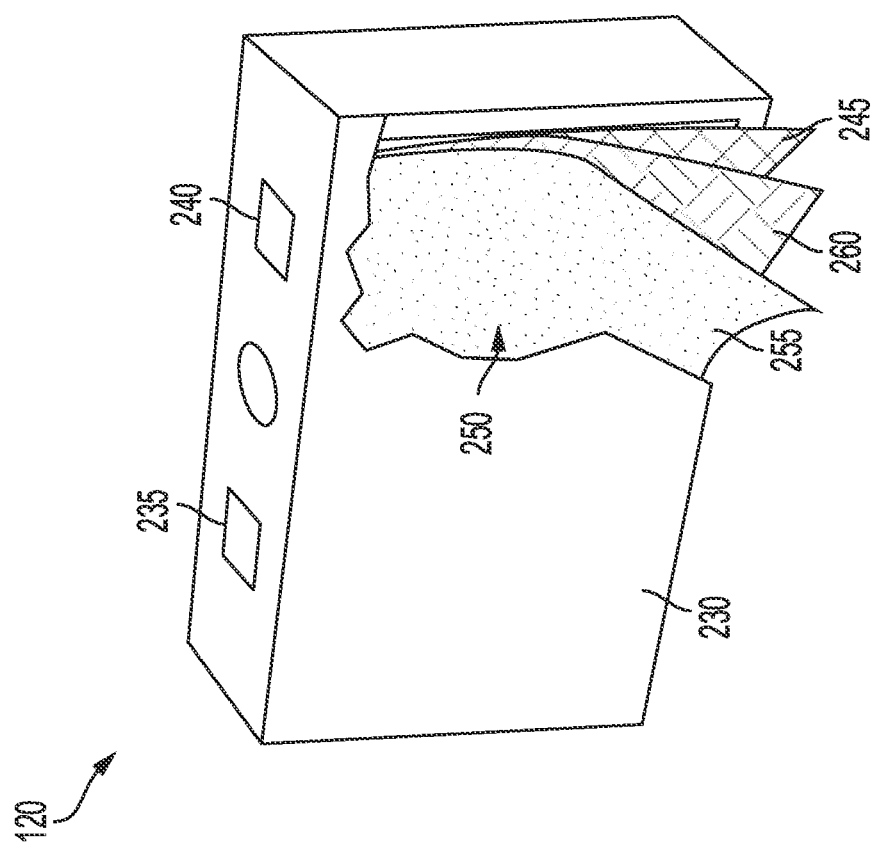
FIG. 2D depicts an example perspective view of a battery cell, in accordance with implementations.
Figure 2E:
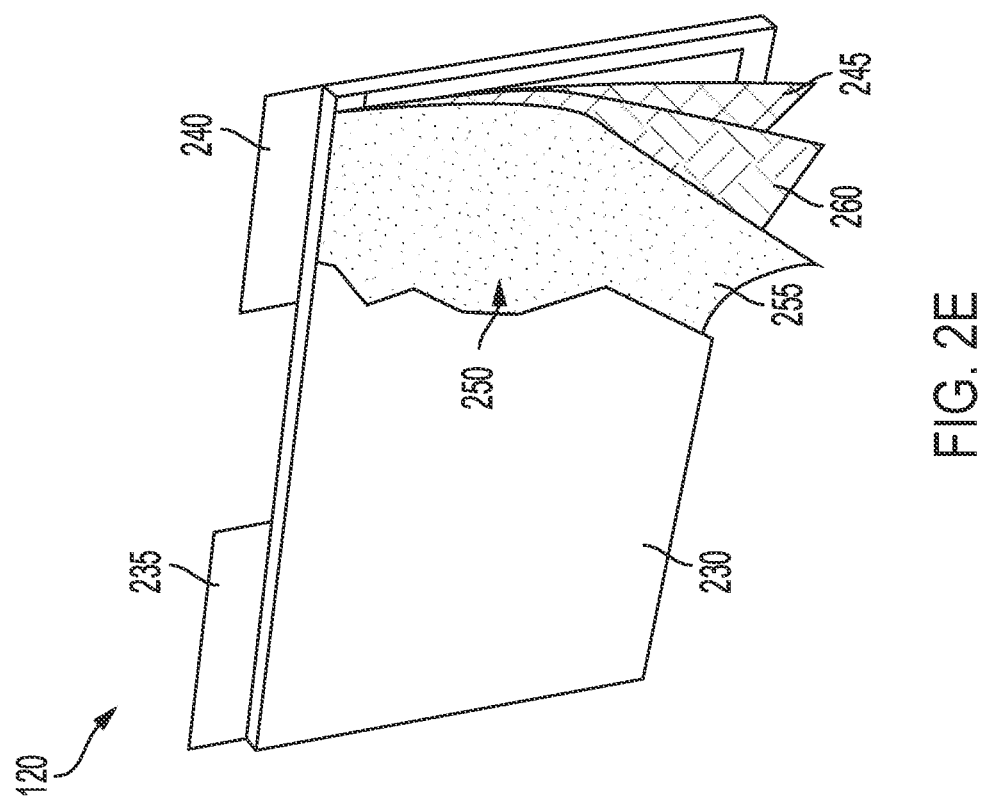
FIG. 2E depicts an example perspective view of a battery cell, in accordance with implementations.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. Each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells, pouch cells, or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 may not include a battery module 115. For example, the battery pack 110 can have a cell-to-pack configuration in which battery cells 120 are arranged directly into a battery pack 110 without assembly into a battery module 115. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated, or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support conduction of ions between electrodes to generate or provide electric power for the battery cell 120. The battery cell 120 can include an electrolyte layer where the electrolyte layer can be or include solid electrolyte material that can conduct ions. For example, the solid electrolyte layer can conduct ions without receiving a separate liquid electrolyte material. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium, graphite, silicon, a lithium alloy (e.g., Li—Mg, Li—Al, Li—Ag, etc.), or a composite (e.g., lithium and carbon, silicon and carbon, etc.) and the battery cell cathode can include a lithium-based oxide material, sulfur, a sulfide (e.g., iron sulfide, metal sulfide), a fluoride (e.g., copper fluoride), or lithium iron phosphate. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include organic polymeric-based electrolytes or inorganic electrolytes, for example phosphide-based, Sulfide-based (e.g., crystalline $\beta$-Li$_3$PS$_4$, amorphous $\alpha$-Li$_3$PS$_4$, $\alpha$-(100–x)Li$_7$·xP$_3$S$_{11}$, $\beta$-(100–x)Li$_7$·xP$_3$S$_{11}$, $\gamma$-(100–x)Li$_7$·xP$_3$S$_{11}$, Li$_2$S—P$_2$S$_5$, Li$_6$PS$_5$Cl, Li$_6$PS$_5$Br, Li$_6$PS$_5$I, etc.), halide-based, oxide-based, ceramic, polymer, or glassy solid-state electrolytes, or any combination thereof. A ceramic electrolyte can include, for example, lithium phosphorous oxy-nitride (Li$_x$-PO$_y$N$_z$), lithium germanium phosphate sulfur (Li$_{10}$GeP$_2$S$_{12}$), yttria-stabilized zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)). A polymer electrolyte (e.g., a hybrid or pseudo-solid-state electrolyte) can include, for example, polyacrylonitrile (PAN), polyethylene oxide (PEO), polymethyl-methacrylate (PMMA), or polyvinylidene fluoride (PVDF). A glassy electrolyte can include, for example, lithium sulfide-phosphor pentasulfide (Li$_2$S—P$_2$S$_5$), lithium sulfide-boron sulfide (Li$_2$S—B$_2$S$_3$), or tin sulfide-phosphor pentasulfide (SnS—P$_2$S$_5$). The solid-state electrolytes can include thio-LISICON Li$_{11-x}$M$_{2-x}$P$_{1+x}$S$_{12}$ (e.g., M=Ge, Sn, or Si), TLi$_2$S—P$_2$S$_5$—LiI, Li$_4$P$_2$S$_7$—LiI, Li$_2$S—M (e.g., M=SiS$_2$, GeS$_2$, P$_2$S$_5$, B$_2$S$_3$, As$_2$S$_3$), xLi$_2$S$_{(1-x)}$SiS$_2$ (e.g., x≤0.6), SiS$_2$—P$_2$S$_5$—Li$_2$S—Li$_2$S—LiI, Li$_7$P$_2$S$_8$I, Li$_{3.25}$Si$_{0.25}$P$_{0.75}$S$_4$, Li$_7$P$_2$S$_8$I, Li$_{15}$(PS$_4$)$_4$Cl$_3$, Li$_{14.8}$Mg$_{0.1}$(PS$_4$)$_4$Cl$_3$, Li$_{10}$SiP$_2$S$_{11.3}$O$_{0.7}$, Li$_{9.4}$Si$_{1.02}$P$_{2.1}$S$_{9.96}$O$_{2.04}$, Li$_{9.54}$Si$_{1.74}$P$_{1.44}$S$_{11.7}$Cl$_{0.3}$, Li$_{11}$AlP$_2$S$_{12}$, 30Li$_2$S—25B$_2$S$_3$—45LiI—xSiO$_2$, or Li$_{1.05}$B$_{0.5}$Si$_x$O$_{2x}$S$_{1.05}$I$_{0.45}$ (0≤x≤1). Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some examples, the battery pack may not include modules. For example, the battery pack can have a cell-to-pack configuration wherein battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor, (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120.

For example, lithium-ion batteries can include an olivine phosphate (Li M PO4, M=Fe and/or Co and/or Mn and/or Ni)) chemistry, LISICON or NASICON Phosphates (Li3M2 (PO4)3 and LiMPO4Ox, M=Ti, V, Mn, Cr, and Zr), for example Lithium iron phosphate (LFP), Lithium iron manganese phosphate (L1VIFP), a layered oxides (LiMO2, M32 Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides (Li1+xM1−xO2) (Ni, and/or Mn, and/or Co), (OLO or LMR), spinel (LiMn2O4) and high voltage spinels (LiMn1.5Ni0.5O4), disordered rock salt, Fluorophosphates Li2FePO4F (M=Fe, Co, Ni) and Fluorosulfates LiMSO4F (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.45V, while an anode layer having a graphite chemistry can have a 0.25V redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 wt % to 80 wt %, or equal to 80 wt % Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some examples, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof In some examples, the solid electrolyte layer can include polyanionic or oxide-based electrolyte material (e.g., Lithium Superionic Conductors (LISICONs), Sodium Superionic Conductors (NASICONs), perovskites with formula $ABO3$ (A=Li, Ca, Sr, La, and B=Al, Ti), garnet-type with formula $A3B2(XO4)3$ (A=Ca, Sr, Ba and X=Nb, Ta), lithium phosphorous oxy-nitride ($Li_xPO_yN_z$). In some examples, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
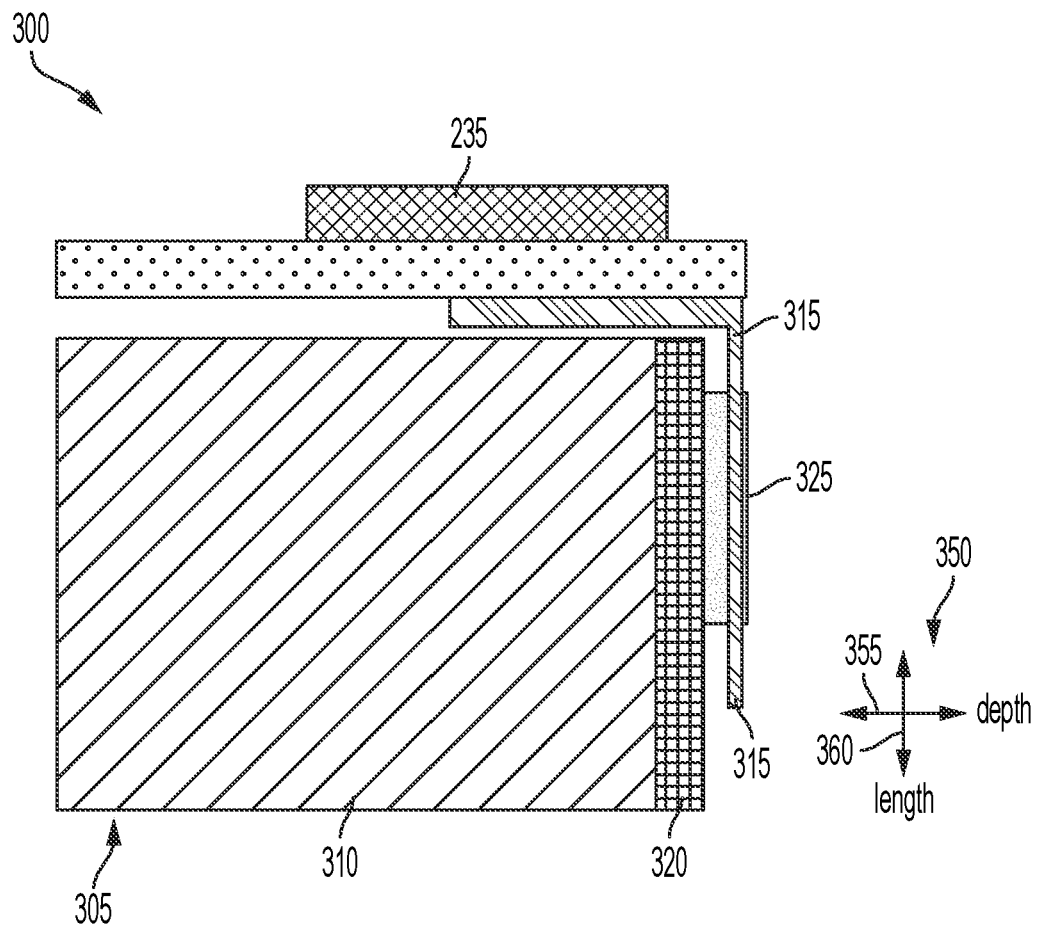
FIG. 3 depicts an example front view of a battery cell system, in accordance with implementations.

FIG. 3 depicts an example front view of a battery cell system 300. The battery cell system 300 can include a battery cell 120 or one or more components of the battery cell 120. For example, the battery cell system 300 can include at least one electrode 305 that forms a portion of an electrode stack (e.g., the jelly roll) of a battery cell 120. For example, as described herein, the electrode 305 can include or can be an anode layer 245 or a cathode layer 255. The electrode stack can include a plurality of electrodes 305 having one or more separators between the electrodes 305. For example, the electrode stack can include a first electrode 305 (e.g., an anode layer 245), a separator layer, and a second electrode 305 (e.g., a cathode layer 255) coupled together to form the electrode stack. The electrode stack can include any number of electrodes 305. It should be understood that one electrode 305 is described herein for illustrative purposes only. The electrode 305 can be disposed within a portion of the housing 230 of the battery cell 120 described herein.

Each electrode 305 can include an active or coated region 310 and an uncoated (e.g., inactive) region 320. The coated region 310 can include an active material that is coated on a thin metallic surface (e.g., a metallic foil). For example, the coated region 310 can include coating a foil formed of aluminum, copper, nickel, or another metallic material with an active material such as metal oxide, graphite, carbon black, carbon nanotubes, Super P carbon black material, Ketjen Black, Acetylene Black, SWCNT, MWCNT, graphite, carbon nanofiber, graphene, high-nickel content (>80% Ni) lithium transition metal oxide, a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"), or another active material. The uncoated region 320 can be or can include regions of the electrode 305 that are uncoated (e.g., inactive) and can facilitate coupling the electrode 305 with a current collector 315. For example, the uncoated region 320 can at least partially protrude from the electrode 305 (e.g., from the foil) to contact a portion of the current collector 315. The uncoated region 320 can be in electrical contact or a physical contact with the coated region 310. The uncoated region 320 can provide, establish, or create an electrical contact or continuity between the coated region 310 and the current collector 315 by a sub tab 325 described herein. The electrode 305 can be or can include a notched (e.g., cut away, carved, etc.) foil or a foil without any notches. For example, the uncoated region can be notched to form an electrode tab of the electrode 305, in which case, the uncoated region can have a smaller dimension width than the coated region and can also be referred to as an electrode tab. In some examples, the uncoated region 320 may not be notched as depicted in FIG. 3, where the coated region and uncoated regions can have the same dimension.

The example illustrated in FIG. 3 can relate to an anode side of a battery cell 120 in which an electrical continuity or electrical contact is formed between the active material coated region 310 of an anode foil (e.g., the electrode 305) and the anode terminal (e.g., the first polarity terminal 235) of the battery cell 120. The electrical contact or continuity can be formed from the coated region 310, via uncoated region 320, and to the current collector 315. The current collector 315 can be in electrical contact with the first polarity terminal 235. The electrode 305 is described in relation to an anode side of the battery cell 120 for illustrative purposes only. The electrode 305 and other components of the battery cell system 300 can alternatively or additionally relate to the cathode side of the battery cell 120. For example, the current collector 315 can electrically couple with the second polarity terminal 240 (e.g., the cathode terminal).

The current collector 315 can be or can include a conductive material that can electrically couple the electrode 305 with another portion of the battery cell system 300. For example, the current collector 315 can electrically couple one or more portions of a first electrode 305 with a second electrode 305 of the electrode stack (e.g., such that electrical current can flow between the electrodes 305 of the electrode stack). The current collector 315 can electrically couple the electrode 305 with an anode terminal (e.g., the first polarity terminal 235) or with a cathode terminal (e.g., the second polarity terminal 240), as another example. A coordinate system 350 is depicted throughout the figures for illustrative purposes only to provide reference for an example orientation of the components of the battery cell system 300 and is in no way intended to limit the scope of the present disclosure. For illustrative purposes, the coordinate system 350 can include a first axis (e.g., a depth axis 355), a second axis (e.g., a length axis 360), and a third axis (e.g., a width axis 415 depicted in at least FIG. 4). The current collector 315 can be formed of various types of aluminum, copper, nickel, or other metallic material.

Figure 4:
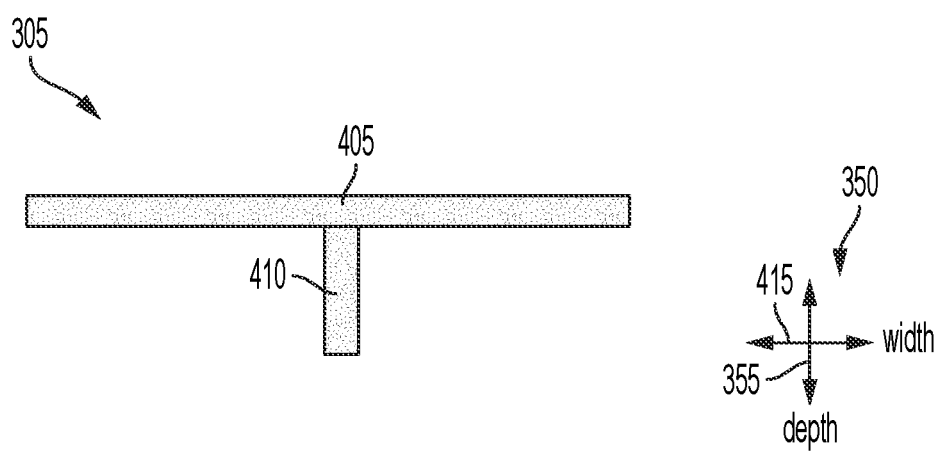
FIG. 4 depicts an example side view of a portion of the battery cell system of FIG. 3, in accordance with implementations.

FIG. 4 depicts an example side view of a tab 325 (e.g., referred to as a sub tab) of the battery cell system 300. The sub tab 325 can facilitate electrically coupling the current collector 315 with the electrode 305 or with the anode terminal or cathode terminal. For example, the sub tab 325 can include one or more surfaces that can facilitate forming a welded joint between the current collector 315 and one or more uncoated regions 320 of the electrode 305. The sub tab 325 can include a first portion 405 and a second portion 410 that can facilitate electrically coupling the electrode 305 with the current collector 315. The first portion 405 can extend in a first direction (e.g., in a direction parallel to the width axis 415) and the second portion 410 can extend in a second direction (e.g., in a direction parallel to the depth axis 355). The first direction can be perpendicular to the second direction such that the sub tab 325 defines a substantially "T" shape. For example, the first portion 405 can define a top portion of a "T" and the second portion 410 can define a stem of the "T." The sub tab 325 can include various other shapes including, but not limited to, asymmetrical shapes, a "Y" shape, a "J" shape, or another shape. The first portion 405 and the second portion 410 can be or can include one or more sheets (e.g., plates, slabs, or other surfaces) of conductive material that connect to form the sub tab 325. The sub tab 325 can include one or more conductive materials including, but not limited to, aluminum, copper, nickel, steel, or another conductive material. The first portion 405 and the second portion 410 of the sub tab 325 can include the same material (e.g., formed from one or more sheets one of material) or the first portion 405 and the second portion 410 of the sub tab 325 can include different materials (e.g., formed from one or more sheets of two or more different materials). The first portion 405 made of the first sheet of material can be perpendicular to the second portion 410 made of the second sheet of material. The first portion 405 can be inclined at various other angles relative to the second portion 410 of the sub tab 325. For example, the first portion 405 can be positioned at an angle between 20 degrees and 165 degrees relative to the second portion 410.

Figure 5:
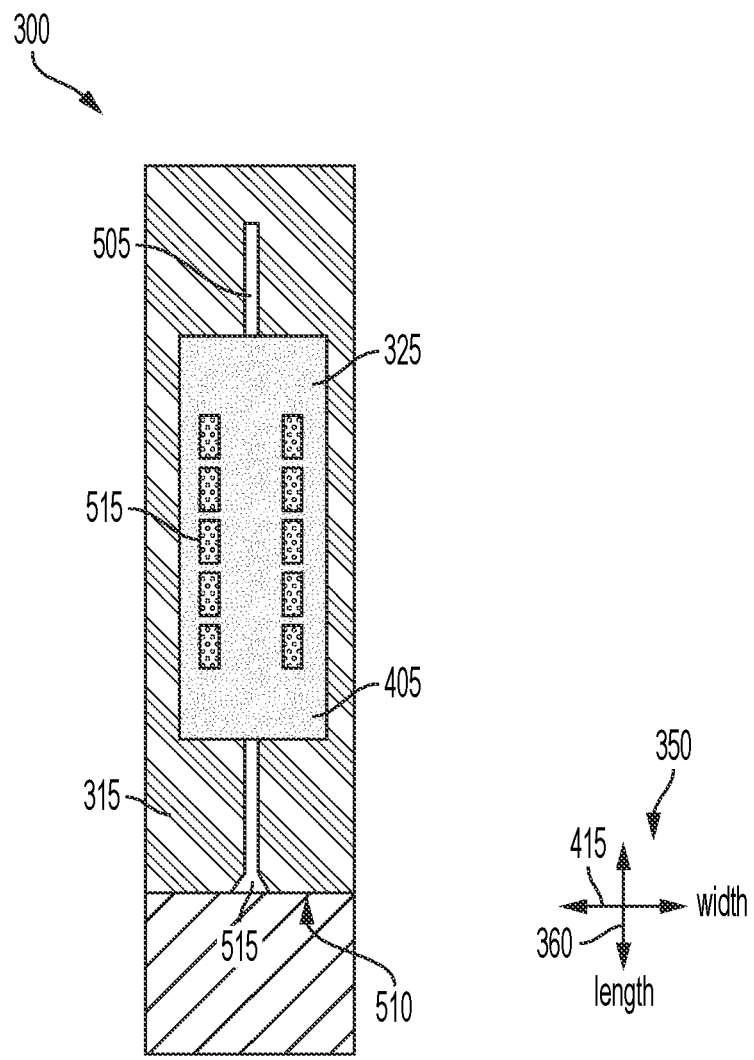
FIG. 5 depicts an example top view of a portion of the battery cell system of FIG. 3, in accordance with implementations.

FIG. 5 depicts an example top view of a portion of the battery cell system 300. The sub tab 325 can be disposed within a slit 505 of the current collector 315. For example, the current collector 315 can include a slit 505 having an opening at an edge 510 of the current collector 315 such that the slit 505 includes a length that extends from the edge 510 through a portion of the current collector 315 to receive the sub tab 325 (e.g., the opening of the slit 505 at the edge 510 can receive the second portion 410 of the sub tab 325). For example, the slit 505 can guide the second portion 410 of the sub tab 325 from the edge 510 towards the opposing end of the slit 505.

The slit 505 can extend in one or more directions relative to a topmost surface 705 (depicted in at least FIG. 7) of the current collector 315. For example, the slit 505 can extend a length (e.g., along the length axis 360), a width (e.g., along the width axis 415), and a depth (e.g., along the depth axis 355). The width of the slit 505 can be equal to or greater than a corresponding width of the second portion 410 of the sub tab 325 such that at least a portion of the slit 505 can receive the second portion 410 of the sub tab 325. The width of at least a portion of the slit 505 can be equal to or greater than a corresponding width of the first portion 405 of the sub tab 325. For example, a portion of the slit 505 can include a length or width that is about equal to or slightly greater than a corresponding length or width of the first portion 405 of the sub tab 325 such that the first portion 405 can engage with (e.g., contact, abut) a portion of the slit 505. For example, the slit 505 can receive the first portion 405 of the sub tab 325 such that the first portion 405 of the sub tab 325 is coplanar (e.g., lies flush) with a portion (e.g., the topmost surface 705) of the current collector 315 when the sub tab 325 is coupled with the current collector 315, as depicted in at least FIG. 8. The second portion 410 of the sub tab 325 can extend through the slit 505 in a direction that is perpendicular to a portion of the current collector 315 that includes the slit 505 (e.g., the second portion 410 can penetrate through the slit 505 in a depth direction as depicted in at least FIGS. 6-8).

The first portion 405 of the sub tab 325 and the second portion 410 of the sub tab 325 can be monolithically formed such that the sub tab 325 includes a single, continuous structure. The first portion 405 and the second portion 410 can be coupled in various other ways including, but not limited to, welding. For example, the first portion 405 can be separate from and connected to the second portion 410 to form the sub tab 325. The sub tab 325 can include more than two portions (e.g., three portions, four portions, or more than four portions).

The sub tab 325 can be welded with the current collector 315. For example, the first portion 405 of the sub tab 325 can be welded with the current collector 315 (e.g., at a welded joint 515). The sub tab 325 can be welded with the current collector 315 by various welding techniques, such as by laser welding. Laser welding the sub tab 325 and the current collector 315 can be minimally invasive (e.g., no contact welding) and can include a fast and efficient weld cycle time. Laser welding can provide a localized heat input and a minimum change in material properties, which can result in a durable welded joint with the least possible electrical resistance. The sub tab 325 can be welded with the current collector 315 by various other welding techniques including, but not limited to, ultrasonic welding and resistance spot welding. The sub tab 325 can be welded with the current collector 315 in at least one of the length or width direction of the current collector 315 (e.g., on a plane defined by the width axis 415 and the length axis 360). For example, the welded joint 515 can extend at least partially along the first portion 405 of the sub tab 325 and the topmost surface 705 of the current collector 315 such that the sub tab 325 can be welded with the current collector 315 along a plane that is coplanar with the topmost surface 705 of the current collector 315.

Figure 6:
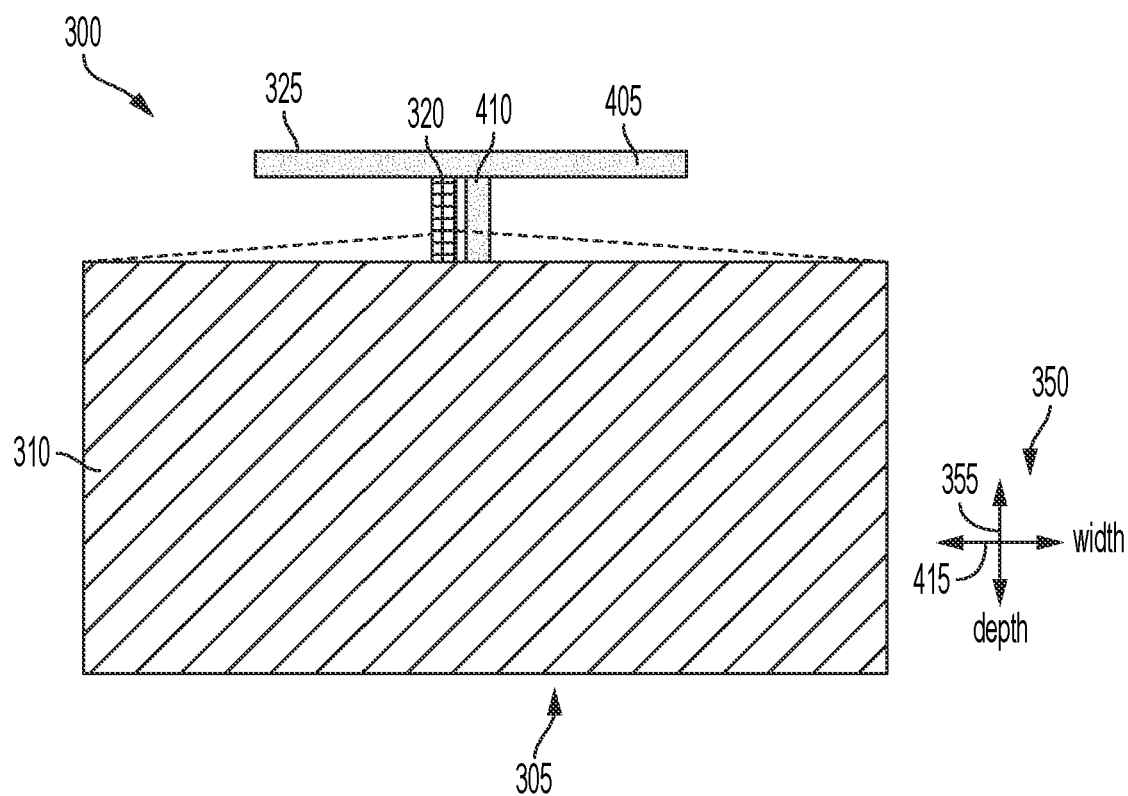
FIG. 6 depicts an example side view of a portion of the battery cell system of FIG. 3 in a first state, in accordance with implementations
Figure 7:
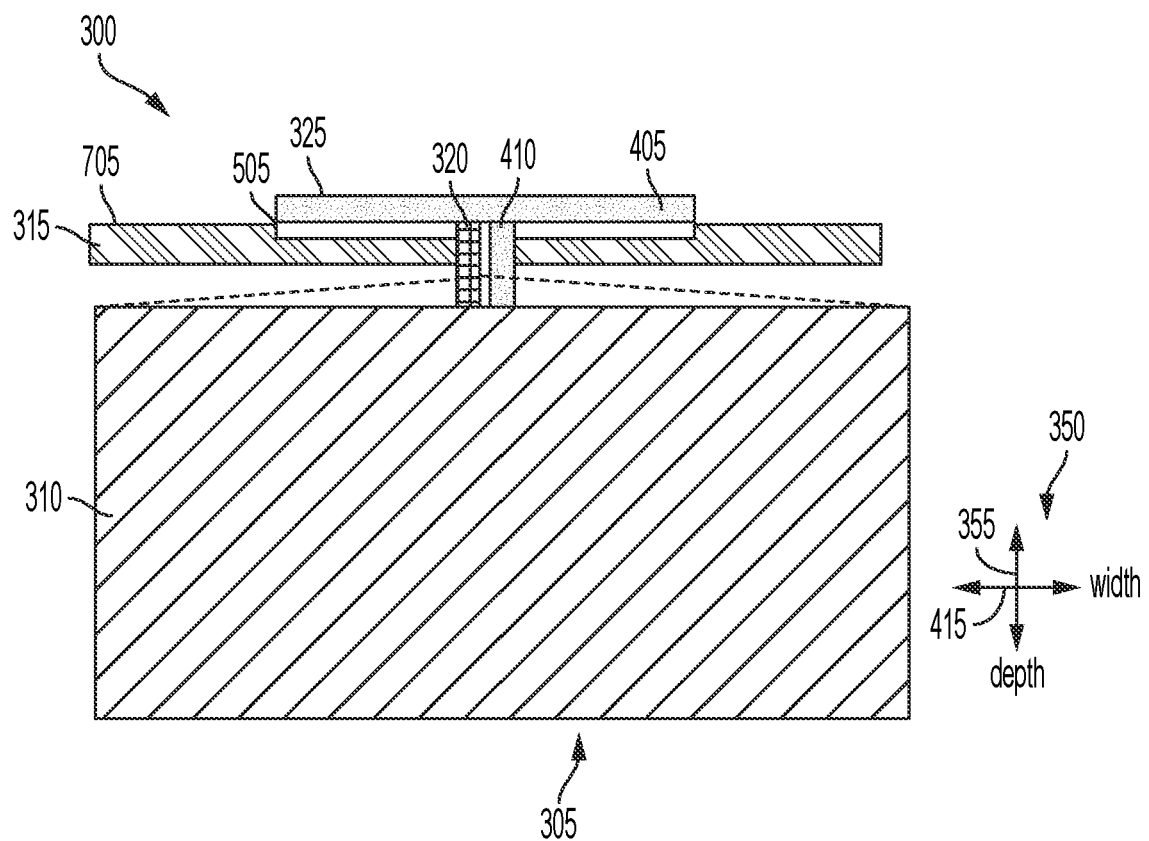
FIG. 7 depicts an example side view of a portion of the battery cell system of FIG. 3 in a second state, in accordance with implementations.
Figure 8:
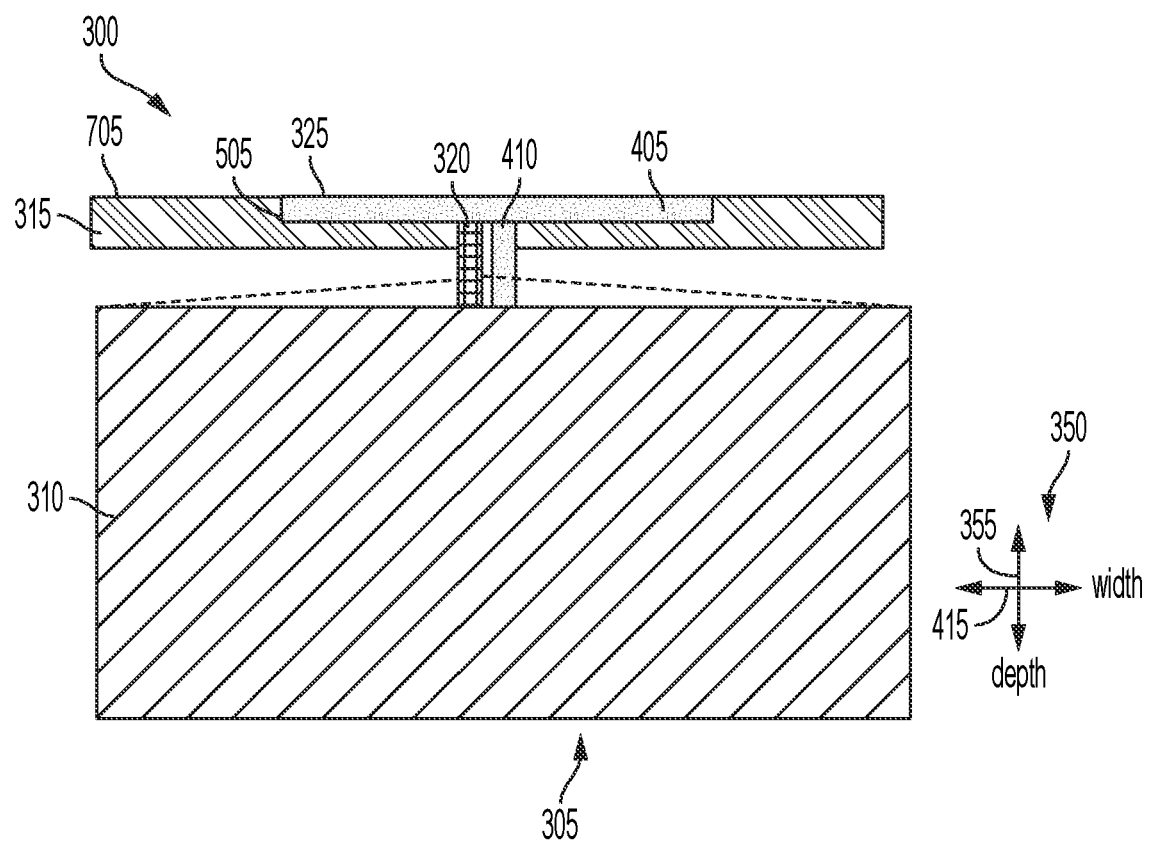
FIG. 8 depicts an example side view of a portion of the battery cell system of FIG. 3 in a third state, in accordance with implementations.

FIGS. 6-8 depict example side views of a portion of the battery cell system 300 during a welding process. For example, FIG. 6 depicts an example side view of a portion of the battery cell system 300 in a first state of a welding process. The uncoated region 320 of the electrode 305 can be welded with the sub tab 325. For example, the uncoated region 320 of the electrode 305 can be welded with the second portion 410 of the sub tab 325. The uncoated region 320 can be welded with the second portion 410 by laser welding, for example. The second portion 410 of the sub tab 325 can be welded with the uncoated region 320 along a plane that lies perpendicular to the first portion 405 of the sub tab 325 (e.g., along a plane defined by the depth axis 355 and the length axis 360).

FIG. 7 depicts an example side view of a portion of the battery cell system 300 in a second state of a welding process. The slit 505 of the current collector 315 can allow the current collector 315 to slide over or onto a portion of the sub tab 325 (e.g., such that the slit 505 is sleeved around the second portion 410 of the sub tab 325). The current collector 315 can move in a direction along the slit 505 relative to the sub tab 325 (e.g., in a direction parallel to the width axis 415), for example. The current collector 315 can move in a second direction perpendicular to the slit 505 (e.g., in a direction parallel to the depth axis 355) such that the slit 505 can engage with the first portion 405 of the sub tab 325 (e.g., the slit 505 can contact a bottom surface of the first portion 405 of the sub tab 325). For example, the current collector 315 can sleeve around the second portion 410 of the sub tab 325 and can move upward to engage with the first portion 405 of the sub tab 325.

FIG. 8 depicts an example side view of a portion of the battery cell system 300 in a third state of a welding process (e.g., corresponding to FIG. 5). As depicted in at least FIG. 5 and FIG. 8, the first portion 405 of the sub tab 325 can be welded with the current collector 315 such that the sub tab 325, the current collector 315, and the uncoated region 320 are electrically coupled with one another (e.g., such that electrical current can flow between the current collector 315, the electrode 305, and the sub tab 325 via the uncoated region 320 of the electrode 305). As described herein, the first portion 405 of the sub tab 325 can be at least partially coplanar with the topmost surface 705 of the current collector 315.

The welded joints formed between the first portion 405 of the sub tab 325 and the current collector 315 and between the second portion 410 of the sub tab 325 and the uncoated region 320 of the electrode 305 can provide an electrical conductive pathway between the electrode 305, the sub tab 325, and the current collector 315 (e.g., electrical current can flow between the electrode 305, the sub tab 325, and the current collector 315). The geometry (e.g., shape, size, and orientation) of the sub tab 325 facilitates providing a generally small welding are between the first portion 405 of the sub tab 325 and the current collector 315 and between the second portion 410 of the sub tab 325 and the uncoated region 320 of the electrode 305. This configuration allows for an increased volume of space for the active coated region 310 of the electrode 305 within the electrode stack within the battery cell housing 230 of the battery cell 120. The increase of the active coated region 310 provides an increase energy density of the battery cell 120 compared to a battery cell 120 that does not use the sub tab 325 (e.g., by having less empty space or gaps within the battery cell 120). For example, the sub tab 325 can provide an increase of 4-5% gain in energy density by reducing inactive space by about 4-5 mm, which can enable an 8-10 mm larger electrode stack in comparison to a battery cell 120 that does not include the sub tab 325. This example is for illustrative purposes. The sub tab 325 can provide significantly higher gain in energy density. For example, the sub tab 325 can provide an increase of 1-99% increase in energy density. The sub tab 325 can reduce inactive space within the battery cell 120 by significantly less or more than 4-5 mm (e.g., 0.1 mm-100 mm).

Figure 9:
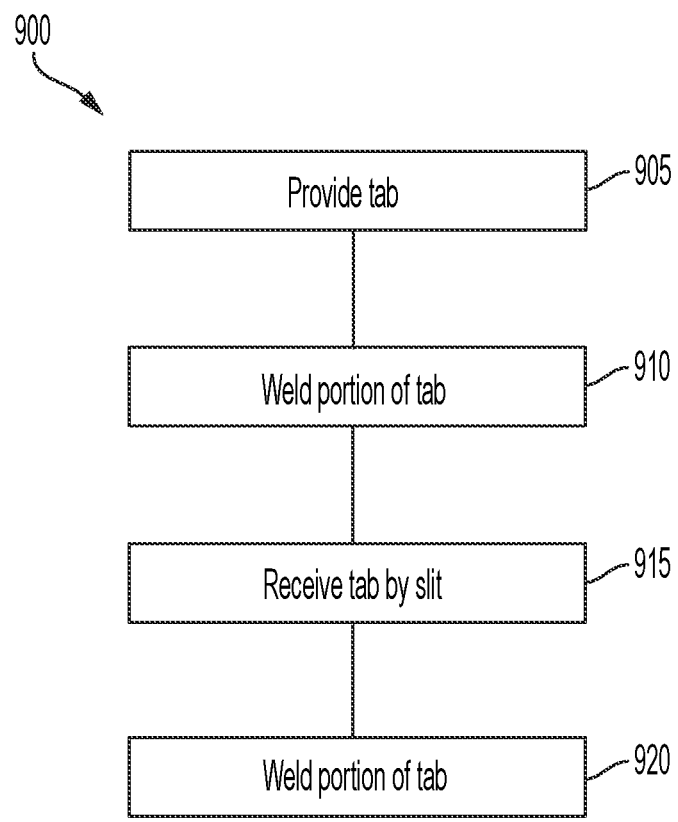
FIG. 9 depicts an example illustration of a process, in accordance with implementations.

FIG. 9 depicts an example illustration of a method 900. The method 900 can include providing a sub tab 325 having a first portion 405 and a second portion 410, as depicted in act 905. The first portion 405 and the second portion 410 of the sub tab 325 can facilitate electrically coupling the electrode 305 with the current collector 315. The first portion 405 can extend in a first direction (e.g., in a direction parallel to the width axis 415) and the second portion 410 can extend in a second direction (e.g., in a direction parallel to the depth axis 355). The first direction can be perpendicular to the second direction such that the sub tab 325 defines a substantially "T" shape. For example, the first portion 405 can define a top portion of a "T" and the second portion 410 can define a stem of the "T." The sub tab 325 can include various other shapes including, but not limited to, asymmetrical shapes, a "Y" shape, a "J" shape, or another shape. The first portion 405 and the second portion 410 can be or can include one or more sheets (e.g., plates, slabs, or other surfaces) of conductive material that connect to form the sub tab 325. The sub tab 325 can include one or more conductive materials including, but not limited to, aluminum, copper, nickel, steel, or another conductive material. The first portion 405 and the second portion 410 of the sub tab 325 can include the same material (e.g., formed from one or more sheets one of material) or the first portion 405 and the second portion 410 of the sub tab 325 can include different materials (e.g., formed from one or more sheets of two or more different materials). The first portion 405 made of the first sheet of material can be perpendicular to the second portion 410 made of the second sheet of material.

The method 900 can include welding the second portion 410 of the sub tab 325 with the uncoated region 320 of the electrode 305 to electrically couple the sub tab 325 with the uncoated region 320, as depicted in act 910. For example, the uncoated region 320 can be laser welded with the second portion 410 of the sub tab 325 to electrically couple the sub tab 325 with the electrode 305 (e.g., the coated region 310) by the uncoated region 320, as depicted in at least FIG. 6. The second portion 410 of the sub tab 325 can be welded with the uncoated region 320 along a plane that lies perpendicular to the first portion 405 of the sub tab 325 (e.g., along a plane defined by the depth axis 355 and the length axis 360).

The method 900 can include receiving, by the slit 505, the sub tab 325, as depicted in act 915. For example, the slit 505 of the current collector 315 can slide over and around the second portion 410 of the sub tab 325 such that the slit 505 at least partially surrounds the second portion 410. The slit 505 can receive the second portion 410 of the sub tab 325 at a region below the first portion 405 of the sub tab 325 (e.g., such that the topmost surface 705 of the current collector 315 is positioned below the first portion 405 of the sub tab 325 in a direction of the depth axis 355) and above the electrode 305 (e.g., such that the topmost surface 705 of the current collector 315 is positioned above the coated region 310 in the direction of the depth axis 355), as depicted in at least FIG. 7.

The method 900 can include welding the first portion 405 of the sub tab 325 with the current collector 315 to electrically couple the sub tab 325 with the current collector 315, as depicted in act 920. For example, the current collector 315 can move in an upward direction relative to the sub tab 325 (e.g., in a positive direction relative to the depth axis 355) such that the slit 505 receives the first portion 405 of the sub tab 325, as depicted in at least FIG. 8. The slit 505 can receive the first portion 405 of the sub tab 325 such that the first portion 405 of the sub tab 325 is coplanar with the topmost surface 705 of the current collector 315. The first portion 405 of the sub tab 325 can be welded with the current collector 315 along a plane that lies perpendicular to the second portion 410 of the sub tab 325 (e.g., along a plane defined by the depth axis 355 and the width axis 415). With the sub tab 325 welded to the current collector 315 and with the uncoated region 320 of the electrode 305, the sub tab 325 can facilitate electrically coupling the electrode 305 with the current collector 315.

Figure 10:
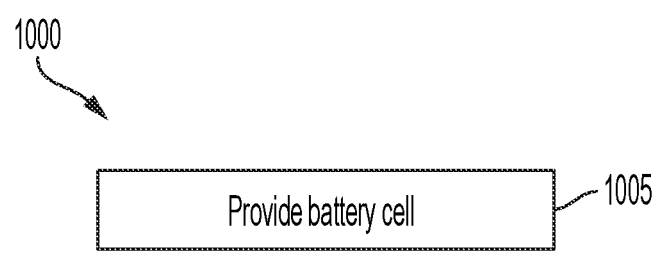
FIG. 10 depicts an example illustration of a process, in accordance with implementations.

FIG. 10 depicts an example illustration of a method 1000. The method 1000 can include providing a battery cell 120, as depicted in act 1005. The battery cell 120 can include the electrode stack having at least one electrode 305 (e.g., at least one anode layer 245 or at least one cathode layer 255). The electrode 305 can include an active coated region 310 and an inactive uncoated region 320. The active coated region 310 can be or can include a foil that is coated with active material described herein. The uncoated region 320 can be free from the active material coating and can at least partially protrude from the coated region 310. The uncoated region 320 can be laser welded with a stem portion (e.g., the second portion 410) of the generally "T" shaped sub tab 325. The sub tab 325 can include a top portion (e.g., the first portion 405) that is received in the slit 505 of the current collector 315. The first portion 405 of the sub tab 325 can be welded with the current collector 315 such that an electrical conductive pathway is formed between the electrode 305, the sub tab 325, and the current collector 315. The geometry (e.g., shape, size, and orientation) of the sub tab 325 facilitates providing a generally small welding are between the first portion 405 of the sub tab 325 and the current collector 315 and between the second portion 410 of the sub tab 325 and the uncoated region 320 of the electrode 305. This configuration allows for an increased volume of space for the active coated region 310 of the electrode 305 within the electrode stack within the battery cell housing 230 of the battery cell 120. The increase of the active coated region 310 provides an increase energy density of the battery cell 120 compared to a battery cell 120 that does not use the sub tab 325.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell, comprising:
a tab including a first portion and a second portion, an electrode having an uncoated region, and a current collector;
the tab disposed within a slit of the current collector;
the first portion and the second portion of the tab configured to electrically couple the current collector with the electrode via the uncoated region of the electrode; and
the slit of the current collector includes a length that extends to an edge of the current collector such that at least one side of the slit forms an opening at the edge to receive the second portion of the tab.

2. The battery cell of claim 1, comprising:
the first portion of the tab extends in a first direction and the second portion of the tab extends in a second direction that is perpendicular to the first direction;
the tab configured to be laser welded to a portion of the current collector along the first portion of the tab; and
the tab configured to be laser welded to a portion of the uncoated region of the electrode along the second portion of the tab.

3. The battery cell of claim 1, comprising:
the slit of the current collector includes a width configured to receive the first portion of the tab such that the first portion lies flush with a portion of the current collector.

4. The battery cell of claim 1, comprising:
the tab configured to be welded to a portion of the current collector along a plane of the first portion of the tab that is coplanar with a surface of the current collector.

5. The battery cell of claim 1, comprising:
the tab configured to couple the electrode with at least one of an anode terminal or a cathode terminal.

6. The battery cell of claim 1, comprising:
the first portion of the tab comprises a first sheet of a conductive material; and
the second portion of the tab comprises a second sheet of the conductive material that is perpendicular to the first sheet of the conductive material.

7. A system, comprising:
a battery cell including an electrode and a current collector;
a tab disposed within a slit of the current collector and including a first portion and a second portion;
the first portion and the second portion of the tab configured to electrically couple the current collector with the electrode; and
the slit of the current collector includes a length that extends to an edge of the current collector such that at least one side of the slit forms an opening at the edge to receive the second portion of the tab.

8. The system of claim 7, comprising:
the first portion of the tab extends in a first direction and the second portion of the tab extends in a second direction that is perpendicular to the first direction;
the tab configured to be laser welded to a portion of the current collector along the first portion of the tab; and
the tab configured to be laser welded to a portion of the electrode along the second portion of the tab.

9. The system of claim 7, comprising:
the slit of the current collector includes a width configured to receive the first portion of the tab such that the first portion lies flush with a portion of the current collector.

10. The system of claim 7, comprising:
the tab configured to be welded to a portion of the current collector along a plane of the first portion of the tab that is coplanar with a surface of the current collector.

11. The system of claim 7, comprising:
the tab configured to couple the electrode with at least one of an anode terminal or a cathode terminal.

12. The system of claim 7, comprising:
the first portion of the tab comprises a first sheet of a conductive material; and
the second portion of the tab comprises a second sheet of the conductive material that is perpendicular to the first sheet of the conductive material.

13. The system of claim 7, comprising:
the slit extends along a topmost surface of the current collector.

14. The system of claim 7, comprising:
the slit to guide the second portion of the tab from the opening at the edge of the slit along the length of the slit towards an opposing end of the slit.

15. A method, comprising:
providing a tab having a first portion and a second portion;
welding the second portion of the tab with an uncoated region of an electrode;
receiving, by a slit of a current collector, the tab; and
welding the current collector with the first portion of the tab to electrically couple the current collector with the uncoated region of the electrode of a battery cell;
wherein the slit of the current collector includes a length that extends to an edge of the current collector such that at least one side of the slit forms an opening at the edge to receive the second portion of the tab.

16. The method of claim 15, comprising:
the first portion of the tab extends in a first direction and the second portion of the tab extends in a second direction that is perpendicular to the first direction;
the tab configured to be laser welded to a portion of the current collector along the first portion of the tab; and
the tab configured to be laser welded to a portion of the uncoated region of the electrode along the second portion of the tab.

17. The method of claim 15, comprising:
the slit of the current collector includes a width configured to receive the first portion of the tab such that the first portion lies flush with a portion of the current collector.

18. The method of claim 15, comprising:
the tab configured to be welded to a portion of the current collector along a plane of the first portion of the tab that is coplanar with a surface of the current collector.

19. The method of claim 15, comprising:
the tab configured to couple the electrode with at least one of an anode terminal or a cathode terminal.

20. The method of claim 15, comprising:
the first portion of the tab comprises a first sheet of a conductive material; and
the second portion of the tab comprises a second sheet of the conductive material that is perpendicular to the first sheet of the conductive material.

\* \* \* \* \*